(12) United States Patent
Ralea (10) Patent No.: US 8,177,308 B2
(45) Date of Patent: May 15, 2012

(54) CONTROLLER FOR ELECTROMECHANICAL BRAKING SYSTEM WITH RUNNING CLEARANCE ADJUSTMENT AND METHOD

(75) Inventor: Mihai Ralea, Boonton Township, NJ (US)

(73) Assignee: Goodrich Corporation, Charlotte, NC (US)

( * ) Notice: Subject to any disclaimer, the term of this patent is extended or adjusted under 35 U.S.C. 154(b) by 677 days.

(21) Appl. No.: 12/092,182

(22) PCT Filed: Nov. 15, 2006

(86) PCT No.: PCT/US2006/060899
§ 371 (c)(1),
(2), (4) Date: Apr. 30, 2008

(87) PCT Pub. No.: WO2007/111704
PCT Pub. Date: Oct. 4, 2007

(65) Prior Publication Data
US 2008/0283346 A1 Nov. 20, 2008

Related U.S. Application Data

(60) Provisional application No. 60/741,327, filed on Nov. 30, 2005.

(51) Int. Cl.
*B60T 13/74* (2006.01)
*F16D 66/02* (2006.01)

(52) U.S. Cl. .......... 303/20; 188/1.11 L; 188/71.8
(58) Field of Classification Search .......... 303/20; 188/1.11 L, 1.11 E, 71.8, 71.9, 196 V, 196 D, 188/161, 162, 156, 157, 158; 318/362, 370, 318/372
See application file for complete search history.

(56) References Cited

U.S. PATENT DOCUMENTS

| | | | |
|---|---|---|---|
| 4,850,459 A * | 7/1989 | Johannesen et al. | 188/156 |
| 6,003,640 A | 12/1999 | Ralea | |
| 6,238,011 B1 | 5/2001 | Heckmann | |
| 6,293,370 B1 * | 9/2001 | McCann et al. | 188/71.8 |
| 6,397,977 B1 * | 6/2002 | Ward | 188/1.11 L |
| 6,471,015 B1 | 10/2002 | Ralea et al. | |
| 6,702,069 B2 | 3/2004 | Ralea et al. | |
| 7,152,716 B2 * | 12/2006 | Taylor et al. | 188/71.8 |
| 2005/0082999 A1 | 4/2005 | Ether | |

FOREIGN PATENT DOCUMENTS

| | | |
|---|---|---|
| EP | 1279854 | 1/2003 |
| WO | 2005119083 | 12/2005 |

* cited by examiner

*Primary Examiner* — Thomas J Williams
(74) *Attorney, Agent, or Firm* — Snell & Wilmer L.L.P.

(57) ABSTRACT

A system and method for establishing a running clearance position for an electromechanical actuator (28), wherein the running clearance is based on an actuator ram (34) position attained during a force application to a brake stack (30). In particular, a running clearance calibrator (66) determines a position value corresponding to a position of the force applicator when retraction from an application of force on the brake stack commences. The running clearance calibrator also generates a running clearance position as a function of the position value.

21 Claims, 5 Drawing Sheets

CONTROLLER FOR ELECTROMECHANICAL BRAKING SYSTEM WITH RUNNING CLEARANCE ADJUSTMENT AND METHOD

RELATED APPLICATION DATA

This application claims the benefit of U.S. Provisional Patent Application No. 60/741,327 filed Nov. 30, 2005, the disclosure of which is incorporated herein by reference in its entirety.

TECHNICAL FIELD

The invention described herein relates generally to electromechanical actuator systems and, more particularly, to an electromechanical braking system for a vehicle, such as an aircraft.

BACKGROUND

Electromechanical brake systems are known in the art. In those systems, an actuator ram applies force to a stack of brake disks to brake a rotating wheel associated with the brake disk stack. When no braking is desired, it has been desirable to position the actuator ram out of contact with the brake disk stack so that the wheel can rotate freely. Often, this position is commanded by a controller and the commanded location is referred to as a running clearance position.

As the disks wear through use of the brake system, the distance between the actuator ram in the running clearance position and the brake stack can increase. Also, during periods of braking, the brake disk stack and structural members of the brake system can undergo thermal expansion and contraction, which also changes the distance between the actuator ram in the running clearance position and the brake stack.

Since it is desirable to maintain a running clearance that is small enough to allow rapid application of brake force and large enough to reduce the risk of inadvertent clamping caused by thermal expansion and brake stack variations, attempts have been made to monitor brake conditions to adjust the commanded running clearance position. However, measuring brake disk stack wear and changes resulting from thermal expansion and contraction have proven to be exceedingly difficult.

SUMMARY OF THE INVENTION

The present invention provides an electromechanical brake system that can establish a running clearance position based on an easily determined value. More particularly, the present invention provides a system and method for establishing a running clearance position for an electromechanical actuator, wherein the running clearance is based on an actuator ram position attained during a force application to a brake stack.

According to one aspect of the invention, there is provided a controller for an electromechanical actuator operative to apply a braking force to brake a wheel of a vehicle, the electromechanical brake actuator having a motor driven to control the displacement of a force applicator relative to a brake stack. The controller includes a running clearance calibrator that determines a position value corresponding to a position of the force applicator when retraction from an application of force on the brake stack commences and that generates a running clearance position as a function of the position value.

Preferably, the running clearance position is generated by combining the position value, a reference running clearance value and a brake deflection value that corresponds to force applied by the force applicator to achieve compression of the brake stack. In particular the combining subtracts the brake deflection value and the reference running clearance from the position value.

According to another aspect of the invention, an electromechanical braking system includes an electromechanical actuator operative to apply a braking force to brake a wheel of a vehicle and having a motor driven to control displacement of a force applicator relative to a brake stack; a controller including a running clearance calibrator that determines a position value corresponding to a position of the force applicator when retraction from an application of force on the brake stack commences and that generates a running clearance position as a function of the position value; a position sensor that provides force applicator position feedback data to the controller; and a force sensor that provides force applicator force feedback data to the controller.

According to yet another aspect of the invention, there is provided a method of adjusting a running clearance of an electromechanical actuator that is operative to apply a braking force to brake of a wheel of a vehicle, the electromechanical brake actuator having a motor driven to control the displacement of a force applicator relative to a brake stack. The method includes the steps of determining a position value corresponding to a position of the force applicator when retraction from an application of force on the brake stack commences; and generating a running clearance position as a function of the position value.

BRIEF DESCRIPTION OF DRAWINGS

These and further features of the present invention will be apparent with reference to the following description and drawings, wherein.

DESCRIPTION

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form.

Figure 1:
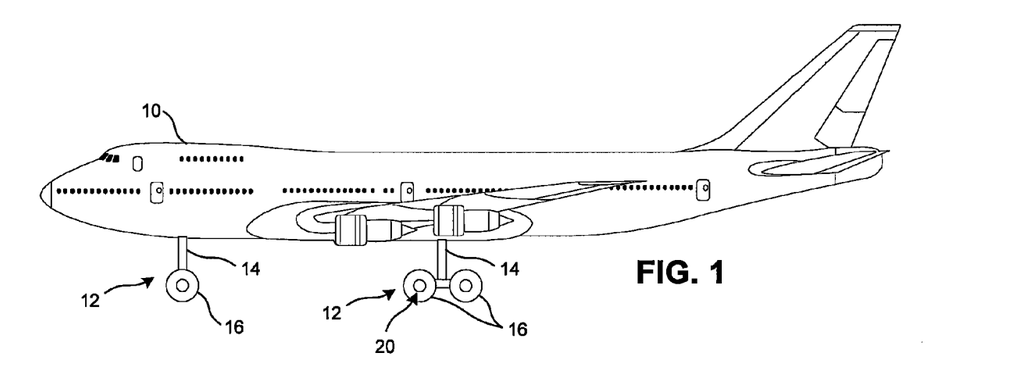
FIG. 1 is a schematic illustration of an exemplary aircraft having at least one electromechanical braking system in accordance with the present invention.

Referring initially to FIG. 1, an aircraft 10 has at least one electromechanical braking system associated with a wheel of the aircraft. An exemplary electromechanical braking system in accordance with the present invention is described below. The illustrated aircraft 10 is intended to depict a generic aircraft and not any particular make or model of aircraft.

The aircraft 10 includes landing gear 12. The landing gear 12 may include a moveable strut 14 and wheels 16. One of more of the wheels 16 can have a braking system 20 for braking the wheel 16.

Figure 2:
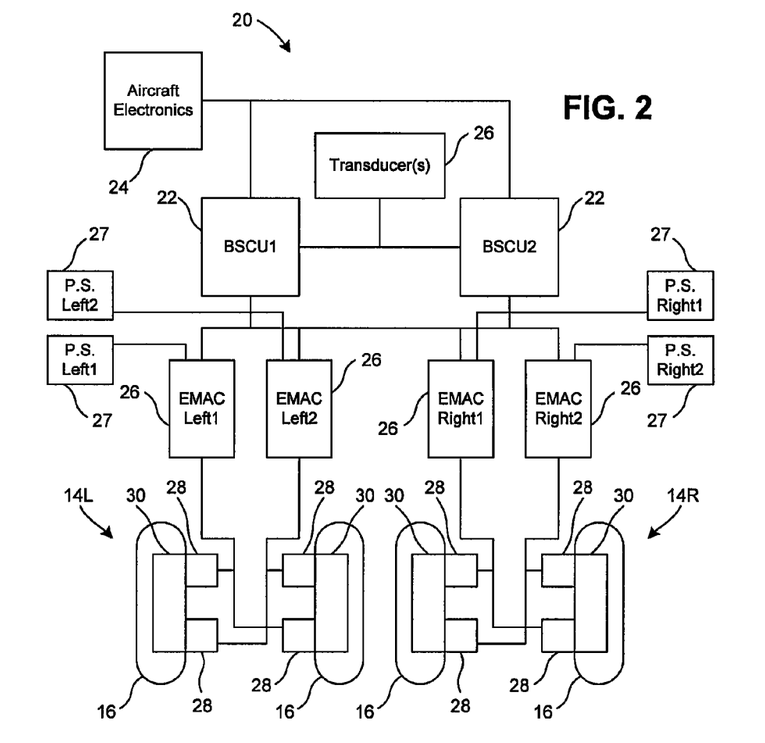
FIG. 2 is a block diagram of an exemplary braking system for the aircraft in accordance with the present invention.

With additional reference to FIG. 2, shown is a block diagram of an exemplary braking system 20 for the aircraft 10. As will become more apparent through the following description, the braking system includes an electromechanical actuator controller that draws power from a power source to drive a motor that controls movement of a moveable item in the form of an actuator ram. The actuator ram applies force to a brake disk stack (also referred to herein as a brake stack) that slows rotation of an associated one of the wheels 16. Running clearance position of the actuator ram is controlled by the electromechanical actuator controller as a function of actuator position at the commencement of a retraction of the actuator ram from a compression of the brake stack. For example, the running clearance position can be determined by subtracting a reference running clearance value and a brake deflection value that corresponds to force applied by the force applicator to achieve the compression of the brake stack from the actuator position at the commencement of the retraction of the actuator ram from a compression of the brake stack.

The braking system 20 shown in FIG. 2 represents an exemplary architecture for satisfying typical redundancy and performance specifications of an aircraft. Such architecture is presented by way of example to illustrate the context in which the principles of the present invention may be employed. It will be appreciated, however, that the present invention has utility with other braking systems and systems other than braking systems. Therefore, the present invention is not limited to the particular architecture shown.

The system 20 includes two brake control units (BSCUs) 22 designated BSCU1 and BSCU2, respectively. BSCU1 and BSCU2 are redundant and are both configured to provide an input/output interface to aircraft electronics 24 within a cockpit of the aircraft 10, for example, via a bus or network. In addition, BSCU1 and BSCU2 each contain circuitry (e.g., a processor for executing logic embodied as executable code) for performing top level brake control and antiskid algorithm processing functions. BSCU1 and BSCU2 each receive proportional brake command signals from transducers 26 associated with user interface devices, such brake pedals or a parking brake switch or lever.

BSCU1 and BSCU2 process the signals from the transducers 26 based on the aforementioned brake control and antiskid algorithms to produce a brake command signal, or set of signals. The brake command signal(s) are provided to electromechanical actuator controllers (EMACs) 26. The particular brake control and antiskid algorithms employed by the BSCUs 22 can be conventional. As such, further detail based thereon is largely omitted in the present description for sake of brevity.

BSCU1 and BSCU2 each provide brake commands and otherwise communicate with the EMACs 26 via a suitable infrastructure, such as a bus or network. In the illustrated system 20, there are four redundant EMACs 26 respectively labeled EMAC Left1, EMAC Left2, EMAC Right1 and EMAC Right2. As shown in FIG. 2, each EMAC 26 is coupled to the BSCUs 22 to receive brake commands (also referred to as input commands or input braking commands) from each of the BSCUs 22. Each EMAC 26 contains circuitry (e.g., a processor for executing logic embodied as executable code) for converting the brake commands into a motor current command. Each EMAC 26 further contains a current driver for generating a motor drive signal based on the motor current command.

Each EMAC 26 can derive power from an aircraft power supply 27. In the illustrated embodiment, EMAC left1 derives power from aircraft primary power supply left1, EMAC left2 derives power from aircraft primary power supply left2, EMAC right1 derives power from aircraft primary power supply right1, and EMAC right2 derives power from aircraft primary power supply right2.

The EMACs 26 may also be referred to simply as controllers 26. The controllers 26 receive left and right brake commands from the BSCUs 22 and provide the motor drive signal to brake actuator modules, also referred to as electromechanical actuators 28 or simply as actuators 28, to drive an actuator component to a commanded position. In this manner, controlled braking may be accomplished.

For each wheel 16, there may be multiple actuators 28 to apply braking force to a brake stack 30 in response to electrical control signals, or motor drive signal, provided by a respective controller 26. For example, the controllers 26 may be paired such that one of the controllers 26 of a pair controls half of the actuators 28 for an associated one of a left wing landing gear 14L or a right wing landing gear 14R. The controlled actuators 28 for any one controller 26 can be on different wheels 16 as shown or on the same wheel 16, in which case a single controller 26 may control all actuators 28 associated with one of the wheels 16.

Additional details of suitable braking systems for the aircraft 10 can be found in commonly assigned U.S. Pat. Nos. 6,003,640, 6,296,325, 6,402,259 and 6,662,907, the disclosures of which are incorporated herein by reference in their entireties.

Figure 3:
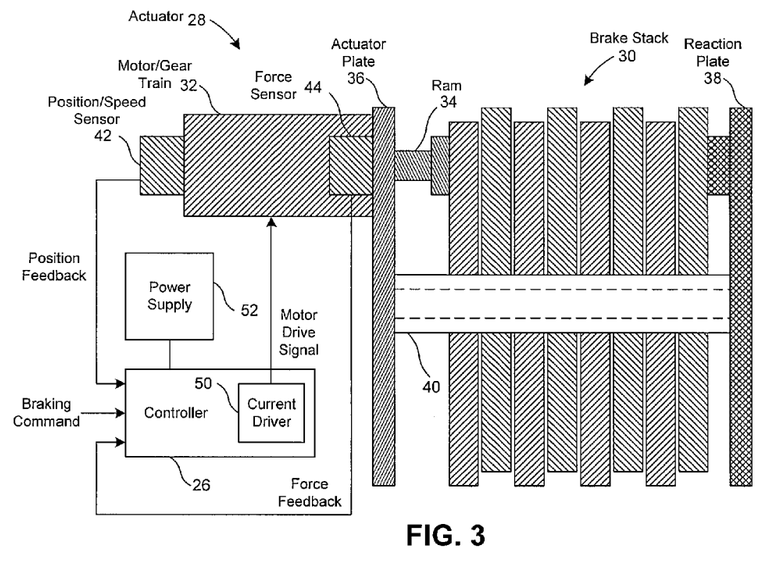
FIG. 3 is a schematic view of the exemplary braking system of FIG. 2, showing an electromechanical actuator, an electromechanical actuator controller and a brake disk stack.

With additional reference to FIG. 3, illustrated is a schematic view of the actuator 28 and controller 26 operatively arranged with the brake stack 30. The actuator 28 is configured to exert a controlled brake force on the brake stack 30. In the illustrated embodiment, the brake stack 30 includes multiple disks and is associated with one of the wheels 16 (FIGS. 1 and 2) of the aircraft 10 (FIG. 1) to provide braking in response to pilot commands and/or antiskid commands. The brake stack 30 can include rotor disks that are keyed to the wheel 16 for rotation therewith. The disks that rotate with the wheel 16 are interleaved with stator disks that do not rotate with the wheel 16. Compression of the interleaved set of disks effects braking of the wheel 16.

The actuator 28 includes a motor and gear train 32 that drives an actuator ram 34 (also referred to as a force applicator) in an axial direction. The actuator 34 is also referred to herein as a force applicator. The actuator 28 is mounted to an actuator plate 36 through which the actuator ram 34 extends. The brake stack 30 is positioned between the actuator plate 36 and a reaction plate 38. In order to exert a braking force, the motor and gear train 32 is controlled by the controller 26 to cause the actuator ram 34 to extend towards the brake stack 30. In this manner, a clamp or brake force is exerted on the brake stack 30 between the actuator ram 34 and the reaction plate 38. Torque is taken out by the brake stack 30 through a torque tube 40 or the like.

In order to release a braking force, the controller 26 controls the motor and gear train 32 to drive the actuator ram 36 in the reverse direction away from the brake stack 30. In the event of no braking, it is desirable to provide a running clearance between the brake stack engagement surface of the actuator ram 34 and the brake stack 30. Accordingly, the controller 26 controls the motor and gear train 32 to provide the desired running clearance when braking is not commanded. Establishment of a commandable running clearance position for the actuator ram 24 is described in greater detail below.

The controller 26 receives as an input in the form of an input signal, such as a force or braking command signal. The value of the command signal is typically proportionally based on the degree to which the pilot has depressed a corresponding brake pedal. In the event of light braking, the command signal may have a low value that causes the controller 26 to drive the motor and gear train 32 such that the actuator ram 34 exerts a light brake force on the brake stack 30. Similarly, in the event of heavy braking the command signal may have a high value that causes the controller 26 to drive the motor and gear train 30 such that the actuator ram 34 exerts a heavy brake force on the brake stack 30. In addition, or in the alternative, the command signal may be based on the results of an antiskid control algorithm carried out by the controller 26 or elsewhere within the aircraft 10, such as in the BSCU 22 (FIG. 2).

As shown in FIG. 3, the actuator 28 includes a position and/or speed sensing device 42. In one embodiment, the position and/or speed sensing device 42 is a embodied as a resolver that senses the position of the rotor of the motor in the motor and gear train 32. Accordingly, the position and/or speed sensing device 42 will also be referred to herein as a resolver 42. Based on the output of the resolver 42, the controller 26 is able to detect the direction and number of revolutions of the rotor and how fast the rotor is spinning (e.g., in revolutions per minute). Since the ratio of the gear train of the motor and gear train 32 in combination with the actuator ram 34 is known, the controller 26 is able to compute the relative position of the actuator ram 34 and motor velocity based on the output of the resolver 42. In other words, the output of the resolver 42 provides relative feedback data that can be converted to a position value of the ram 34 and/or a velocity value of the motor. That is, rotor position and rotor speed can be interchanged by tracking resolver 42 output with a position counter and timer (e.g., position accumulator) and making a comparison against a reference location for the actuator ram 34.

In other embodiments, the position/speed sensor 42 can be embodied as a device for providing absolute position feedback to the controller 26, such as an LVDT transducer. In any implementation, position feedback information assists the controller 26 in performing position based control functions of the actuator 28. According to the exemplary embodiment, the motor within the motor and gear train 32 is a brushless DC motor. Consequently, the controller 26 also utilizes the output of the resolver 42 to determine the appropriate phasing of the power signals provided to the motor via the motor drive signal to provide a desired motor commutation. In this manner, there is no need for separate position sensors for the DC motor and the actuator ram 34, respectively.

The actuator 28 further includes a force sensor 44 that detects the force exerted by the actuator ram 34 onto the brake stack 30. The output of the force sensor 44 is fed back as a force feedback signal and is input to the controller 26 for performing force based control functions over the actuator 28. The force sensor 44 may be any type of known force sensor including, but not limited to, a force load cell or the like.

In FIG. 3, for sake of simplicity, only a single actuator 28 is shown for applying a brake force to the brake stack 30. However, as indicated above with respect to FIG. 2, it will be appreciated that typically the system will include multiple, identically operated actuators 28 spaced apart on the actuator plate 36 and each for exerting brake force on the brake stack 30. Each actuator 28 may have its own position/speed sensor 42 and force sensor 44 that provide feedback signals to the appropriate controller(s) 26.

Figure 4:
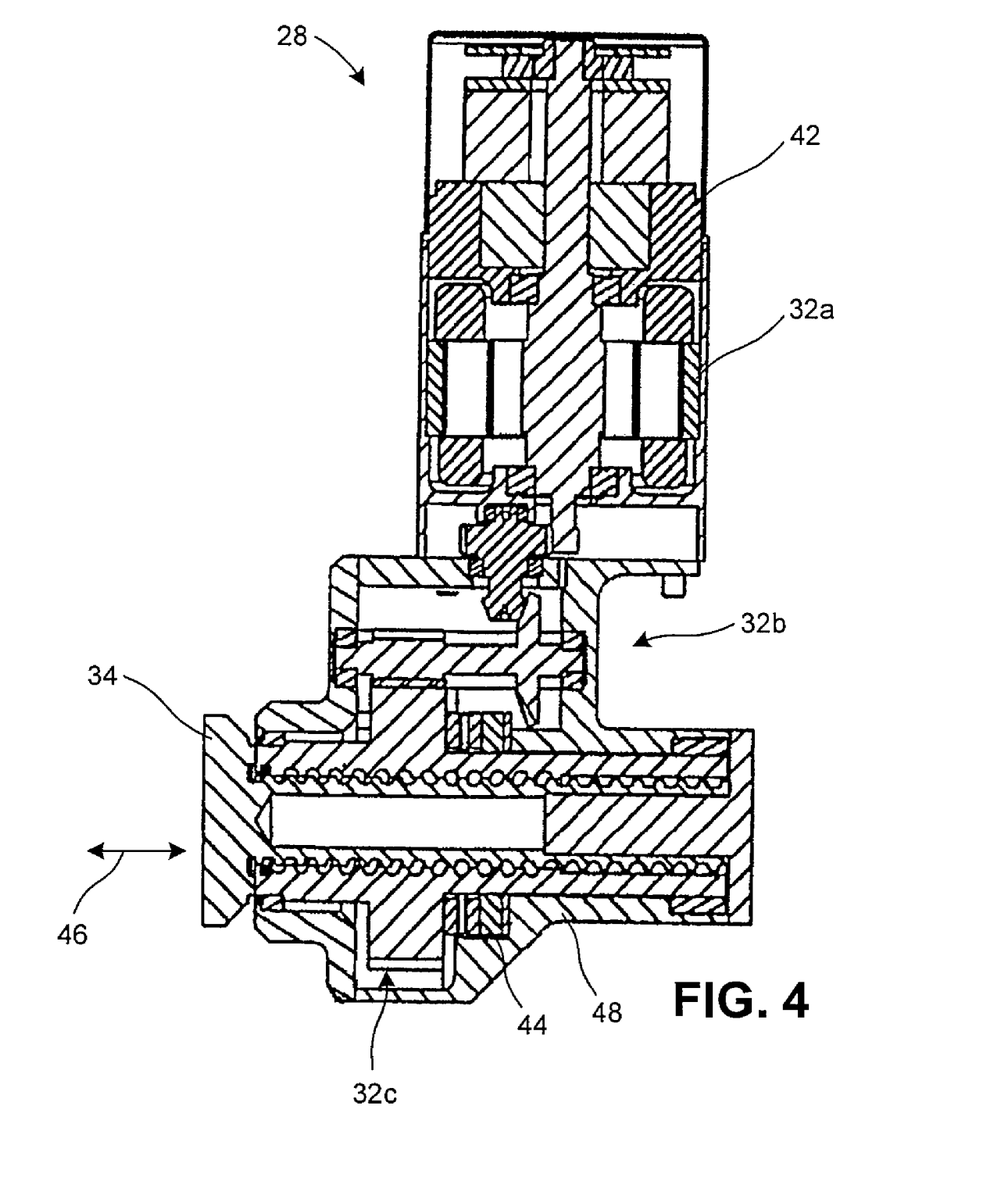
FIG. 4 is a cross-sectional view of an exemplary electromechanical actuator of FIG. 3.

With additional reference to FIG. 4, the exemplary actuator 28 is shown in cross-section. The actuator 28 includes a motor 32a with an integral resolver position/speed sensor 42. The motor 32a drives a gear train 32b, which, in turn, drives a ballscrew assembly 32c. The ballscrew assembly 32c drives the actuator ram 34 back and forth in the axial direction of arrow 46 so as to exert a force on the brake stack 30 (FIG. 3).

Reaction of the ballscrew assembly 32c, which corresponds to load reaction force of the actuator ram 34, is taken out through the force sensor 44 and into an actuator housing 48 and then into the actuator plate 94. In the illustrated embodiment, the force sensor 44 is a force load cell located between the ballscrew assembly 32c and the actuator housing 48. In this manner, the output of the force sensor 44 is indicative of the brake force applied by the actuator ram 34 to the brake stack 30.

With continuing reference to FIGS. 3 and 4, the controller 26 uses a closed loop feedback arrangement to generate the motor drive signal in accordance with the input braking command. For example, the controller 26 can use force and/or position compensation to convert the input braking command into a current command. A motor current driver 50 converts the current command into the motor drive signal with sufficient current to drive the motor 32a as desired, including generating sufficient torque to exert a desired amount of braking force on the brake stack 30 with the actuator ram 34. An exemplary description of position and force feedback based operation of the controller 26 can be found in U.S. patent application Ser. No. 11/145,138, filed Jun. 3, 2005, the disclosure of which is incorporated by reference in its entirety.

Operational electrical power for motor drive signal generation by the motor driver 50 can be derived from a power supply 52. The power supply 52 can be any suitable power source available from the aircraft 10. For instance, the power supply 52 can be the power supply 27 of FIG. 2, DC or AC power busses (connected to the controller directly or via a voltage converter), a battery, an independent power generator or combination of sources where one source supplements for another if the first were to fail to supply power.

Figure 5:
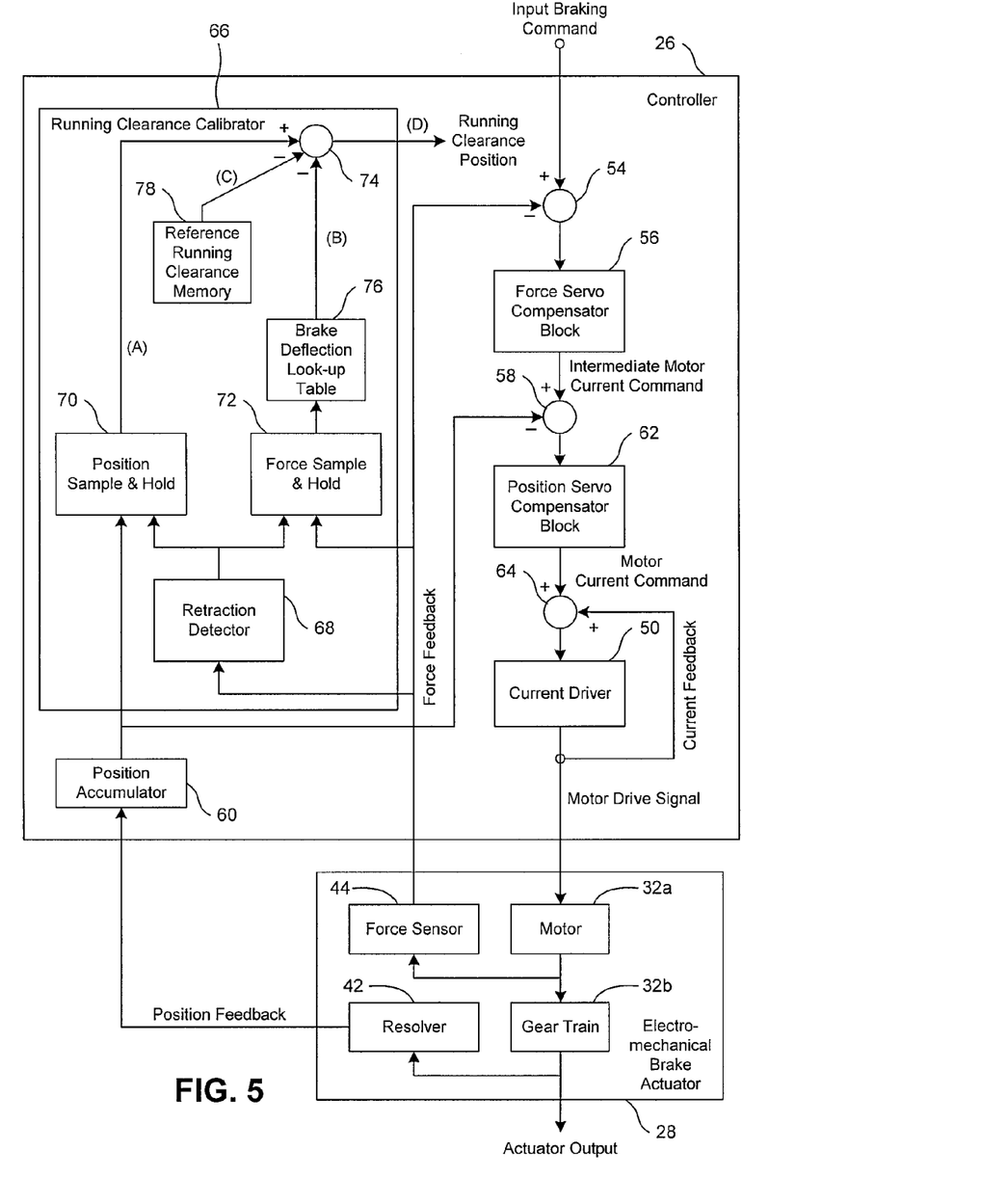
FIG. 5 is a functional block diagram of the actuator and controller of FIG. 3.

With additional reference to FIG. 5, a block diagram of the controller 26 is shown. FIG. 5 also represents a control method. The control approach uses a position value corresponding to a position of the actuator ram 34 when retraction from a compression of the brake stack commences to establish a running clearance position of the actuator ram 34. It will be appreciated that the control functions of the controller 26 can be embodied as executable logic that is executed by a processor of the controller 26. Alternatively, dedicated circuitry can be used to carry out the control functions described herein. As described below in greater detail, the illustrated controller 26 includes an inner current servo control loop, an intermediate position servo control loop and an outer force servo control loop. As will be appreciated, other feedback control techniques are possible, each of which are intended to fall within the scope of the present invention.

A first adder 54 compares the input braking commands and the force feedback signal output by the force sensor 44. In one embodiment, the input braking command may be received in the form of a force command. The difference signal from adder 54 is input to a force servo compensator block 56 that acts on the difference signal to generate an intermediate motor current command. In the illustrated example, the intermediate motor current command is in the form of position command. A second adder 58 compares the intermediate motor current command and a position feedback signal. The position feedback signal can be generated by a position accumulator 60 in response to the position feedback received from the resolver 42. For example, using a reference position for the actuator ram 34 (e.g., a fully retracted position) and the relative rotor position data from the resolver 42, the position accumulator 60 can determine the position of the actuator ram 34 at any particular time.

The difference signal from adder 58 is input to a position servo compensator block 62 that acts on the difference signal from adder 58 to generate a motor current command. A third adder 64 compares the motor current command and a current feedback signal derived from the motor drive signal output by the current driver 50. The output of the third adder 64 is input to the current driver 50 for generation of the motor drive signal (e.g., in the form of electrical current) in accordance with the output of the third adder 64.

When the input braking command indicates that no braking is needed, the controller 26, through the force servo compensator block 56 and the position servo compensator block 62 can generate a motor current command to move the actuator ram 34 to a running clearance position. As indicated, the running clearance position can be determined by the controller 26.

The running clearance position can be reestablished after each retraction from the application of force to the brake stack 30 by the actuator ram 34. In some instances, after the application of force, no additional braking will be called for by the input braking command and the controller 26 can position the actuator ram 24 at a location corresponding to the established running clearance position. In other instances, after the application of force, additional braking will be called for and the established running clearance position will not be used. For example, during an antiskid operation of the electromechanical braking system, the ram 34 is cycled between compressions of and retractions from the brake stack at about 10 Hz. During antiskid operation or other appropriate instances, the running clearance position can be reestablished after each compression cycle, but not used. Rather, the controller 26 will control the actuator 34 to move to a desired position other than the running clearance position and/or apply force to the brake stack 30.

A running clearance calibrator 66 can be used to generate the running clearance position. The running clearance calibrator 66 effectively establishes and stores the running clearance position each time the commencement of a retraction from the application of force on the brake stack 30 occurs. The stored value at any particular time can be used by the controller 26 to position the actuator ram 34 at a location corresponding to the most recently established running clearance position to establish a running clearance of the actuator ram 34 from the brake stack 30.

The running clearance calibrator 66 includes a retraction detector 68 configured to output a retraction detection signal to a position sample and hold 70 and a force sample and hold 72. The retraction detector receives force feedback data from the force sensor 44. The retraction detector 68 is configured to track the force applied by the actuator ram 34 on the brake stack 30. In particular, the retraction detector 68 monitors for the application of force on the brake stack 30 by the actuator ram 34. Force may increase as more braking power is called for by the input braking command. At some point, the force will reach a maximum value and begin to decrease when the controller 34 commences a retraction of the actuator ram 34 from the brake stack 30. At the moment in time when the retraction from a force application is sensed, the retraction detector 68 outputs the retraction detection signal to the position sample and hold 70 and the force sample and hold 72.

The position sample and hold 70 samples the position of the actuator ram 34 using the output of the position accumulator 60. Upon receipt of the retraction detection signal, the position sample and hold 70 holds the current actuator ram 34 position value. This value will be held until a subsequent retraction detection signal is received, at which time the then current position of the actuator ram 34 will be held by the position sample and hold 70. The position sample and hold 70 outputs the held position value to an adder 74.

The force sample and hold 72 samples the force of the actuator ram 34 on the brake stake 30 using the output of the force sensor 44. Upon receipt of the retraction detection signal, the force sample and hold 72 holds the force detected by the force sensor 44. This value will be held until a subsequent retraction detection signal is received, at which time the then current force will be held by the force sample and hold 72. The force sample and hold 72 outputs the held force value to a brake deflection look up-table 76.

The relationship between force applied to the brake stack 30 and how much the brake components deflect as a result of such force can be stored by the look-up table. In one embodiment, the amount of brake deflection for various force values can be determined empirically and stored in the brake look-up table 76. The deflection values stored by the brake deflection look-up table or otherwise calculated can include the amount of compression and/or movement by the brake stack 30, as well as movement by the reaction plate 38, the torque tube 40 and the actuator plate 36, and internal reaction of actuator 28 components.

The brake look-up table 76 translates the force value received from the force sample and hold 72 into a brake deflection value. As will be appreciated, other ways of translating force applied to the brake stack 30 and deflection of the brake stack 30 and related components are possible, each of which are intended to fall within the scope of the invention as defined by the claims appended hereto. For instance, a function can be established to relate deflection and force and, using the force value from the force sample and hold 72, the deflection value can be computed.

It is noted that brake deflection, and the corresponding deflection value, does not change as a result of brake stack 30 wear or thermal expansion/contraction of the brake stack 30. Rather, for at least the purposes of establishing a running clearance position, brake deflection is dependent on force applied to the brake stack 30 and not wear or thermal expansion/contraction. However, the actuator position held by the position sample and hold 70 is dependent on brake stack 30 wear and thermal expansion/contraction of the brake stack 30.

The deflection value output of the brake deflection look-up table 74 is input to the adder 74. Also input to the adder is a reference running clearance value, which can be a constant value stored by a reference running clearance memory 78. The reference running clearance value is a desired distance of the actuator ram 34 from the brake stack 30 when no braking is called for by the input braking command regardless of brake wear or thermal expansion/contraction of the brake system components.

The adder 74 combines the held actuator position value, the deflection value and the reference running clearance value and outputs a corresponding running clearance position. In the illustrated embodiment, the adder 74 subtracts both the deflection value and the reference running clearance value from the held actuator position value. As will be appreciated, the output running clearance position is held until the retraction detector 68 detects a retraction from a force application by the actuator ram 34 and outputs the retraction detection signal, at which time the running clearance position will be updated in accordance with the newly held actuator position value and deflection value.

The running clearance position represents the distance from the actuator reference value to position the actuator ram 34 to achieve the desired running clearance location. When positioned at the running clearance location, the actuator ram 34 is separated from the brake stack 30 by a distance equal to or approximately equal to the reference running clearance. Therefore, when the controller 26 is to command the actuator ram 34 to move to the running clearance position, the current running clearance position output by the adder 74 can be used by the feedback control elements of the controller 26 to generate the appropriate motor drive signal to appropriately position the actuator ram 34.

Figure 6:
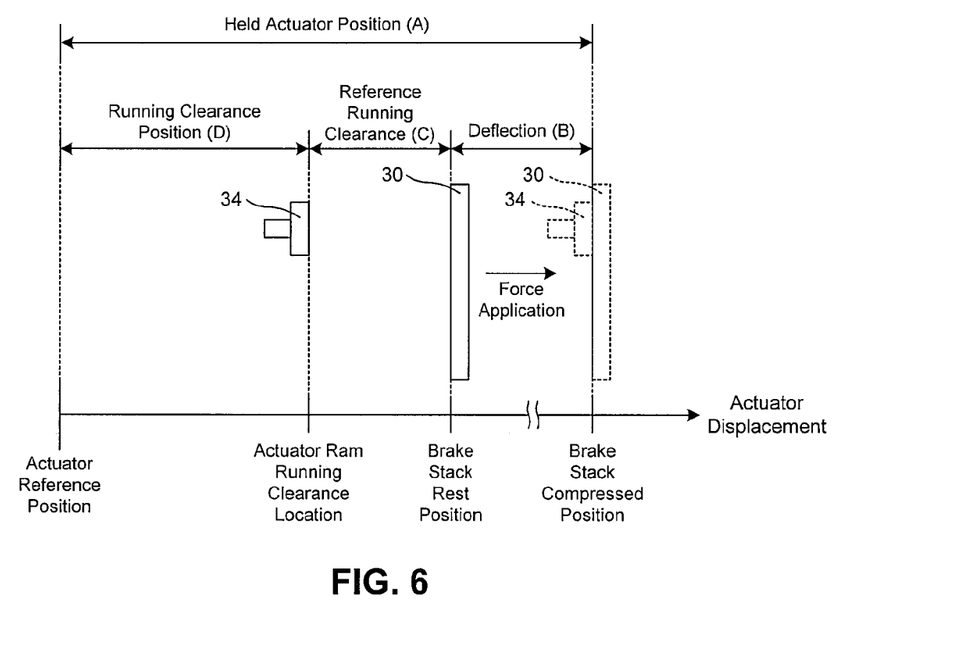
FIG. 6 is a graphical representation of a method of establishing a commandable running clearance position in a braking system.

FIG. 6 graphically shows how the running clearance position is generated. With reference to FIGS. 5 and 6, when the actuator 34 is not engaged with the brake stack 30 or "just touching" the brake stack 30 with minimal force, the brake stack 30 will typically be in a rest position. The rest position can be influenced by factors such as wear and thermal expansion/contraction. As force is exerted on the brake stack 30 by the actuator ram 34, the brake stack 30 will deflect, such as by compression of the brake stack 30. The amount of deflection is related to the amount of force.

At the moment that the retraction detector 68 detects that a retraction of the actuator from the force application has commenced, the held actuator position (value A) is determined. At that moment, the force applied to the brake stack 30 is also determined. The force is translated to the deflection value (value B), which is indicative of how much brake deflection occurred from the rest position as a result of the applied force. The predetermined reference running clearance value (value C) and the deflection value (value B) are subtracted from the held actuator position (value A) to generate the running clearance position (value D), which is a commandable distance from a reference position for the actuator ram 34. The running clearance position (value D) can be the commanded position when separation of the actuator ram 34 from the brake stack 30 by about the reference running clearance amount is desired.

As will be appreciated, determination of the running clearance position is based on actuator ram 34 position attained during a force application to the brake stack 30. This differs from conventional running clearance calibration routines that adjust running clearance position only during periods in which the brake is not used. The techniques described herein allow for continuous running clearance calibration during brake operation. The actuator ram 34 position attained during a force application to the brake stack 30 is dependent in part on brake stack 30 wear and thermal expansion and contraction of the brake stack 30 and brake system components, such as the actuator 28 (FIG. 3), the reaction plate 38 (FIG. 3), the torque tube 40 (FIG. 3) and the actuator plate (FIG. 3). As a result, the determined running clearance position (value D) includes compensation for brake stack 30 wear and thermal expansion/contraction.

It will be appreciated that the present invention is not limited to an electromechanical actuation assembly for braking, but any electromechanical system where a running clearance is desired between an actuator and an item acted upon by actuator. In addition, the invention has application to the braking systems of vehicles other than an aircraft (e.g., train brakes).

Although the invention has been shown and described with respect to a certain preferred embodiment or embodiments, it is understood that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A controller for an electromechanical actuator operative to apply a braking force to brake a wheel of a vehicle, the electromechanical brake actuator having a motor driven to control the displacement of a force applicator relative to a brake stack, the controller comprising a running clearance calibrator that determines a position value corresponding to a position of the force applicator and force feedback data corresponding to the force applicator during a braking cycle in response to retraction from an application of force on the brake stack and that generates a running clearance position as a function of the position value,
wherein the running clearance calibrator includes a brake deflection look-up table for outputting a brake deflection value based on a force value corresponding to force applied by the force applicator to compress the brake stack.

2. The controller of claim 1, wherein the running clearance position is generated by combining the position value, a reference running clearance value and a brake deflection value that corresponds to force applied by the force applicator to achieve compression of the brake stack.

3. The controller of claim 2, wherein the combining subtracts the brake deflection value and the reference running clearance from the position value.

4. The controller of claim 1, wherein the running clearance calibrator includes a force sampler and a retraction detector, the force sampler holding a sampled force value as the force applied by the force applicator to achieve the compression of the brake stack when the retraction detector detects the commencement of the retraction.

5. The controller of claim 1, further comprising a motor driver to drive the motor to position the force applicator at a location corresponding to about the running clearance position when braking is not commanded.

6. The controller of claim 1, wherein the running clearance calibrator includes a position sampler and a retraction detector, the position sampler holding a sampled position value as the position value when the retraction detector detects the commencement of the retraction.

7. The controller of claim 1, wherein the vehicle comprises an aircraft.

8. An electromechanical braking system, comprising:
an electromechanical actuator operative to apply a braking force to brake a wheel of a vehicle and having a motor driven to control displacement of a force applicator relative to a brake stack;
a controller including a running clearance calibrator that determines a position value corresponding to a position of the force applicator and force feedback data corresponding to the force applicator during a braking cycle in response to retraction from an application of force on the brake stack and that generates a running clearance position as a function of the position value;

a position sensor that provides force applicator position feedback data to the controller;

a force sensor that provides the force feedback data to the controller and wherein the running clearance calibrator includes a brake deflection look-up table for outputting a brake deflection value based on a force value corresponding to force applied by the force applicator to compress the brake stack.

9. The system of claim 8, wherein the running clearance position is generated by combining the position value, a reference running clearance value and a brake deflection value that corresponds to force applied by the force applicator to achieve compression of the brake stack.

10. The system of claim 9, wherein the combining subtracts the brake deflection value and the reference running clearance from the position value.

11. The system of claim 8, wherein the running clearance calibrator includes a force sampler and a retraction detector, the force sampler holding a sampled force value as the force applied by the force applicator to achieve the compression of the brake stack when the retraction detector detects the commencement of the retraction.

12. The system of claim 8, further comprising a motor driver to drive the motor to position the force applicator at a location corresponding to about the running clearance position when braking is not commanded.

13. The system of claim 8, wherein the running clearance calibrator includes a position sampler and a retraction detector, the position sampler holding a sampled position value as the position value when the retraction detector detects the commencement of the retraction.

14. The system of claim 8, wherein the vehicle comprises an aircraft.

15. A method of adjusting a running clearance of an electromechanical actuator that is operative to apply a braking force to brake of a wheel of a vehicle, the electromechanical brake actuator having a motor driven to control the displacement of a force applicator relative to a brake stack, comprising:

determining a position value corresponding to a position of the force applicator and force feedback data corresponding to the force applicator during a braking cycle in response to retraction from an application of force on the brake stack; and generating a running clearance position as a function of the position value, wherein the generating combines the position value, a reference running clearance value and a brake deflection value that corresponds to force applied by the force applicator to achieve compression of the brake stack;

sampling force applied by the force applicator on the brake stack upon the detection of the retraction; and translating the sampled force to the brake deflection value.

16. The method of claim 15, wherein the combining includes subtracting the brake deflection value and the reference running clearance from the position value.

17. The method of claim 15, further comprising commanding the motor to position the force applicator at a location corresponding to the running clearance position when braking is not commanded.

18. The method of claim 15, wherein the determining and the generating are carried out each time the force applicator is retracted from application of force on of the brake stack to generate a calibrated running clearance position that accounts for thermal expansion and contraction of the electromechanical brake actuator and wear of the brake stack.

19. The method of claim 15, wherein the determining the position value includes sampling the force applicator position upon the detection of the retraction.

20. The method of claim 15, wherein the translating is carried out using a look-up table.

21. The method of claim 15, wherein the vehicle comprises an aircraft.

* * * * *